Oct. 9, 1934.    L. F. NENNINGER    1,976,136
MILLING MACHINE
Filed May 2, 1930    6 Sheets-Sheet 2

Fig. 2

Inventor
LESTER F. NENNINGER
By A. H. Parsons
Attorney

Oct. 9, 1934.　　　　L. F. NENNINGER　　　1,976,136
MILLING MACHINE
Filed May 2, 1930　　　6 Sheets-Sheet 5

Inventor
LESTER F. NENNINGER
By A. H. Parsons
Attorney

Patented Oct. 9, 1934

1,976,136

UNITED STATES PATENT OFFICE 1,976,136

MILLING MACHINE

Lester F. Nenninger, Cincinnati, Ohio, assignor to The Cincinnati Milling Machine Company, Cincinnati, Ohio, a corporation of Ohio Application May 2, 1930, Serial No. 449,205

22 Claims. (Cl. 90—19)

This invention relates to milling machines and more particularly to a transmission and control mechanism therefor.

One of the principal objects of the present invention is the provision of a milling machine having an improved transmission for actuating either the spindle carrier unit or the various units of the work support organization thereof at either a feed or rapid traverse rate.

Another object of this invention is to provide a milling machine with a variable speed transmission for effecting translation of either a work support unit or a spindle carrier unit at a plurality of feed rates and unitary control means associated therewith for determining the feed rate of either of the units.

A further object of this invention is to provide a milling machine having a translatable spindle carrier unit and a shiftable work support unit with a single variable speed mechanism for imparting to said units a plurality of feed rates or a rapid traverse rate and independent control means for each of said rates.

A still further object of this invention is the provision of a knee and column type milling machine having an adjustable spindle carrier with means on the work supporting elements for controlling the power actuation of said carrier.

An additional object of this invention is the provision of an improved transmission for effecting power adjustment of the spindle carrier of a milling machine and automatic control means therefor.

Referring to the drawings in which like reference numerals indicate like parts.

In the drawings, the reference numeral 10 indicates the base of a milling machine having the vertical column 11 upon which is mounted the work support organization comprising the knee 12 vertically movable upon the column 11, the saddle 13 mounted upon the knee for movement toward and from the column and the work table 14 translatably mounted upon the saddle for movement in a direction at right angles thereto. A cutter spindle 15 is rotatably mounted in a spindle carrier 16 which is adjustably mounted on the overhanging portion 17 of the column for movement toward and from the work support organization.

Figure 1:
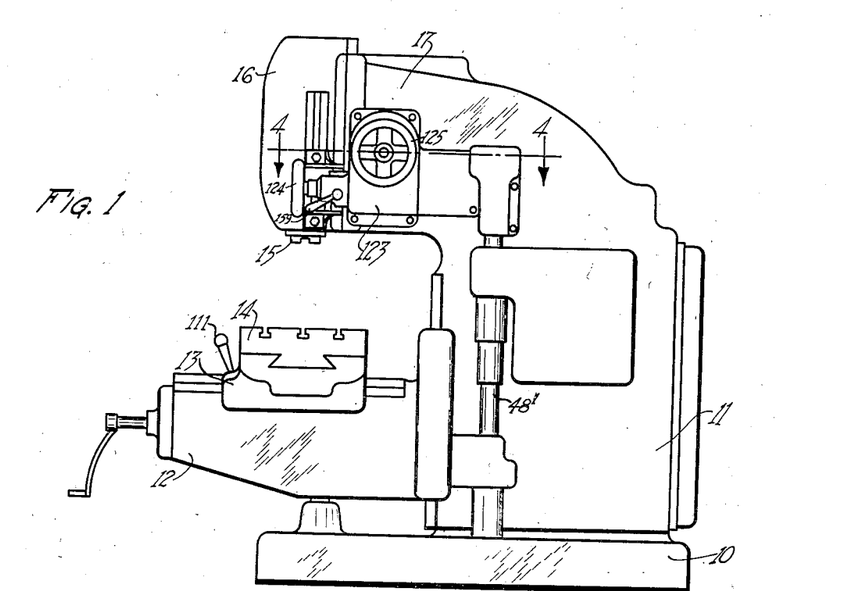
Figure 1 is a side elevation of a milling machine.
Figure 2:
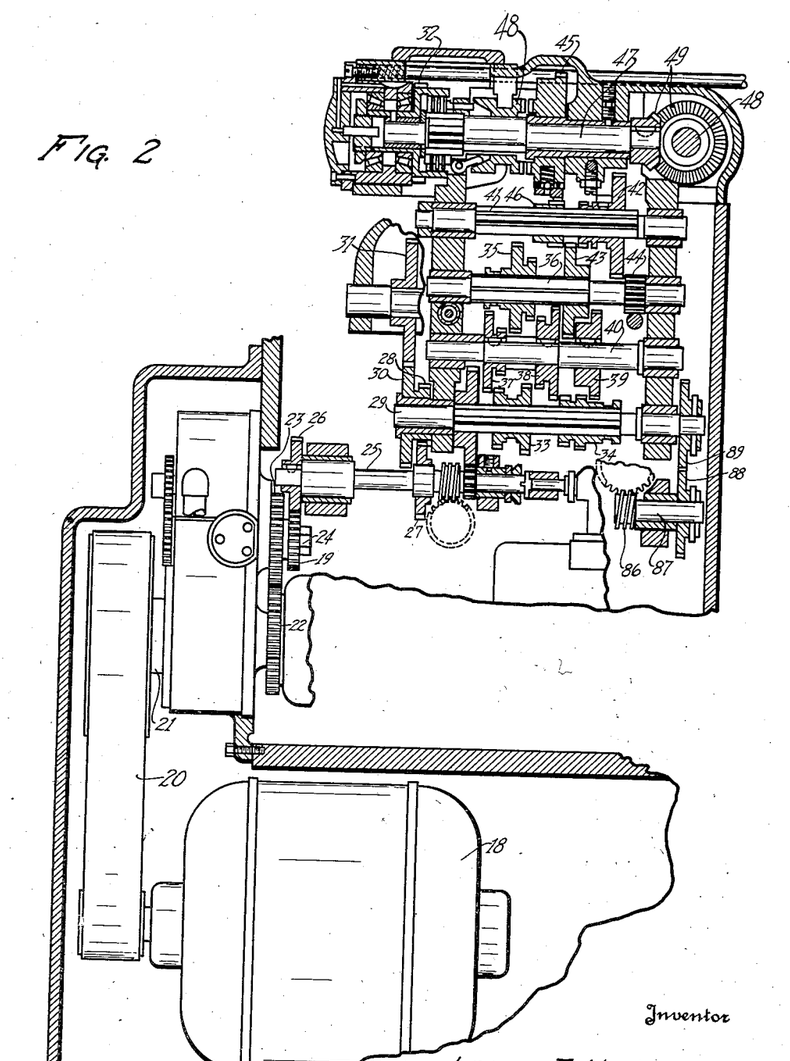
Figure 2 is an expanded view of the variable feed transmission.

From the foregoing it is apparent that the machine is provided with four movable elements for effecting various relative movements between the work and the cutter and these elements are adapted to be power actuated from a single transmission. Referring to Figure 2 a prime mover such as 18 is provided for continuously actuating the main drive gear 19 through power transmitting elements comprising the power transmitting band 20 connecting the prime mover with a shaft 21, which has the gear 22 mounted thereon for actuating the gear 23 keyed to the stub shaft 24 upon which the gear 19 is mounted. An intermediate shaft 25 is journaled in the column having the gears 26 and 27 for receiving and transmitting power from the gear 19 to the gear 28 respectively. This gear is mounted upon the main transmission shaft 29, which is parallel to the shaft 25, and which has integrally connected therewith the gear 30 for actuating through gear 31 the rapid traverse driving gear 32.

The gear 28 also actuates through the shaft 29 the variable feed transmission comprising the shiftable gear couplets 33 and 34 on the shaft 29 and the shiftable gear couplet 35 on the shaft 36 adapted to selectively engage the gear couplets 37, 38 and 39 fixed to the intermediate parallel shaft 40 for transmitting any one of eight different speeds from the shaft 29 to the shaft 36. A shaft 41 parallel to the shaft 36 is provided with a shiftable gear couplet 42 for engaging either of the gears 43 or 44 fixed to the shaft 36 for transmitting any one of sixteen speeds to the final driver 45 through the gear 46 fixed to the shaft 41. The final gears 32 and 45 of the variable transmission are mounted for free rotation upon the shaft 47 and a clutch member 48 is interposed for selective engagement with either gear for actuating the shaft at a rapid traverse rate or at a feed rate.

The shaft 47 is adapted through bevel gears 49 to drive shaft 48 which is vertically journaled at the side of the column and enclosed by tubes 48' and connected by branch transmissions with the knee, saddle, table and spindle carrier. The drive to the saddle, table, and knee is effected through gear 50 splined on the shaft 48 and journaled in the knee for movement up an down therewith. This gear through interconnected gearing actuates the spline shaft 52, (Figure 7) having slidably mounted thereon the bevel gear 53 for driving the reverser mechanism 54 through the bevel gear 55. The reverser mechanism is adapted to actuate the table feed screw 56 for effecting reciprocation of the work table 14.

The gear 50 also actuates through interconnected gearing the reverser 57 for selectively controlling the movement of the saddle 13 in either direction of movement and the reverser 58 selectively controlling the vertical movements of the knee 12. It is thus seen that the work table 14 may be translated from the shaft 48 at either a feed or a rapid traverse rate in any one of three directions.

In addition the shaft 48 is extended vertically for transmitting feed or rapid traverse movements to the spindle carrier 16. To this end a gear 59 is keyed to the upper end of shaft 48 to drive the spindle carrier reverser mechanism 60 through the intermediate gear 61. The reverser includes the clutch member 62 splined on the shaft 63 for selective engagement with clutch element 62' or 62" for actuating the worm wheel 64 through the worm 65 in a clockwise or counter clockwise direction. The worm wheel 64 is mounted for free rotation on the shaft 66 and adapted to be clutched thereto for actuating the pinion 67 which engages the rack 68 fixed to the spindle carrier 16. Thus the spindle carrier may be power translated at either a feed or rapid traverse rate in either of its directions of movement.

Figure 6:
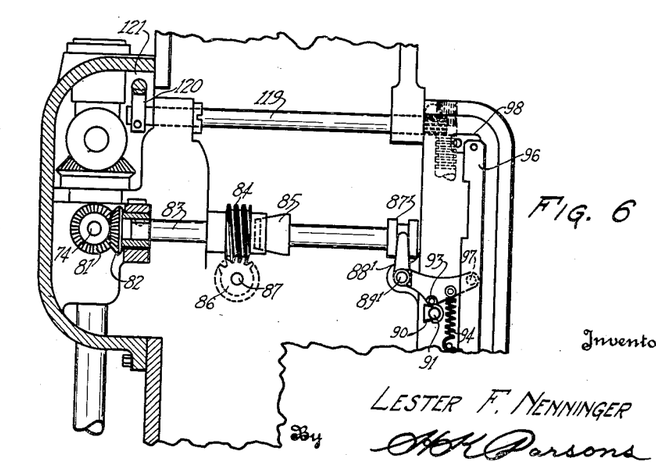
Figure 6 is a detail view of the control elements.
Figures 7, 8:
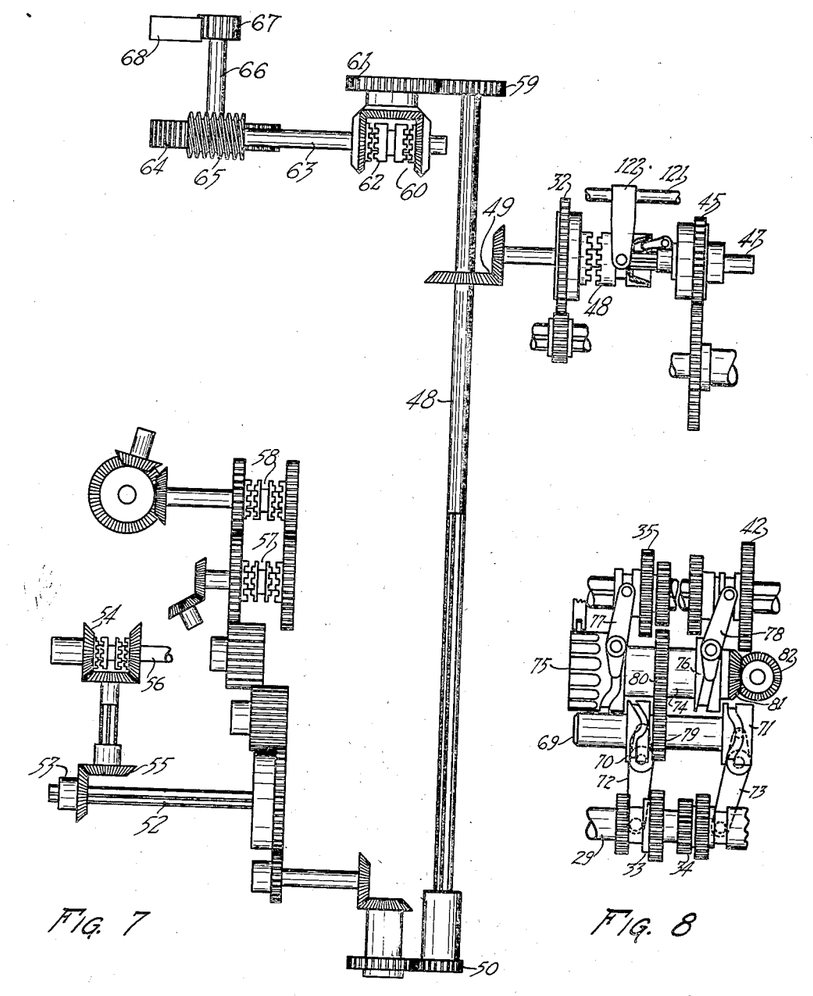
Figure 7 is a diagrammatic view of the general transmission.
Figure 8 is a detail view of the speed change mechanism.
Figure 9:
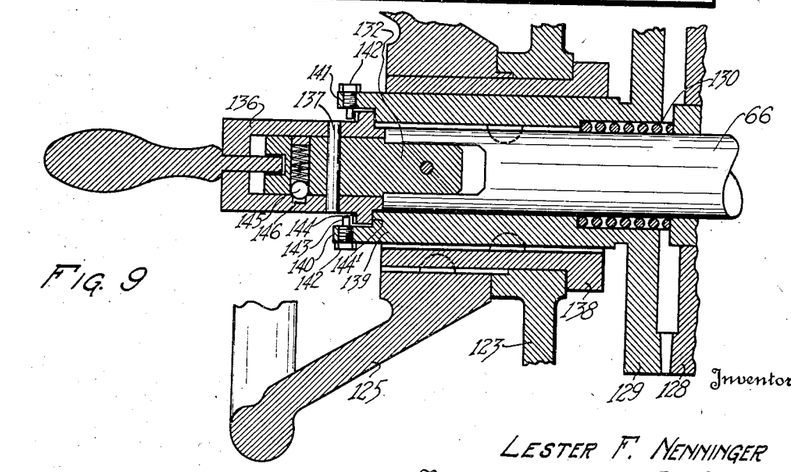
Figure 9 is a section taken on the line 9—9 of Figure 4.

In order to determine the feed rate of the various movable elements a power actuated feed change mechanism is provided in conjunction with the variable feed transmission. Referring more particularly to Figure 8 a cam shaft 69 is journaled in the column parallel to the main transmission shaft 29 and has mounted thereon cam drums 70 and 71 for effecting through the shifter arms 72 and 73 shifting movements of the gear couplets 33 and 34 respectively in a predetermined sequence to effect progressive changes of feed rates in the transmission. Another shaft 74 is journaled adjacent thereto having the cam drums 75 and 76 for shifting the gear couplets 35 and 42 respectively through the shifter arms 77 and 78. These shifting movements are also made in a predetermined sequence to effect progressive changes of feed rates in the transmission. The shafts 69 and 74 are interconnected by spur gears 79 and 80 for joint rotation. Power operation of these shafts is effected by means of the bevel gear 81 (Figure 6) fixed to the end of shaft 74 meshing with the bevel gear 82 journaled in a fixed part of the column and having a spline connection with the shaft 83 which is adapted to be rotated by the helical gear 84 through the clutch 85. The helical gear 84 is mounted for free rotation on the shaft 83 but fixed against axial movement with respect thereto and engages helical pinion 86 keyed to the stub shaft 87 which in turn is driven through interconnecting gears 88 and 89 by the main drive shaft 29 as shown more particularly in Figure 2. The clutch member 85 is fixed with the shaft 83 and has a spool 87' engaged by the bell crank 88' for reciprocating the shaft to effect engagement and disengagement of the clutch.

Figure 5:
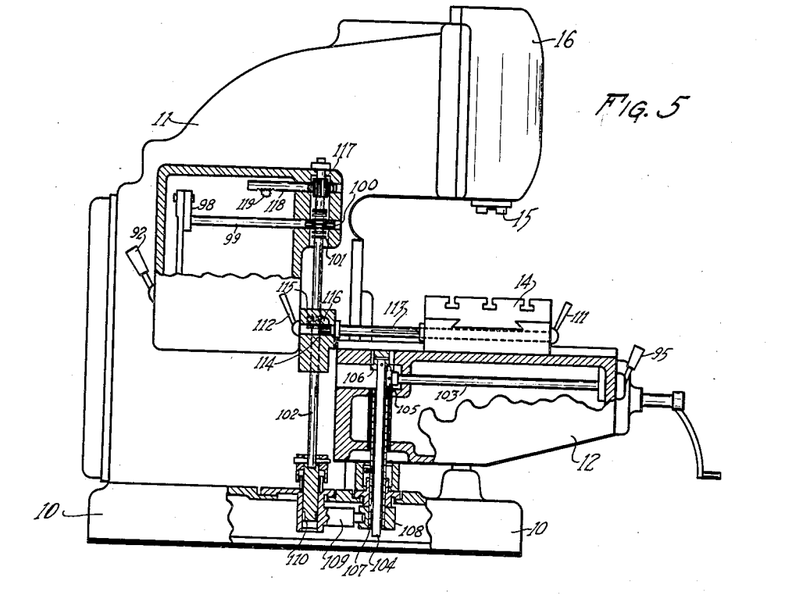
Figure 5 is an elevation partly in section of the milling machine shown in Figure 1 but viewed from the opposite side.

The bell crank 88' is pivoted at 89' to a fixed part of the machine and adapted to be operated from a plurality of control stations on the machine. For instance it may be operated from a control station at the side of machine through the control lever 92, as shown in Figure 5, or from a control station at the front of the machine through the control lever 95. The lever 92 is mounted on the projecting end of a stub shaft 91 journaled in the column which has fixed thereto the cam member 90 engaging a roller 93 rotatably mounted on the bell crank. Upon rotation of the handle 92 from its vertical position, shown in Figure 5, the cam 90 will engage the roller 93 to pivot the bell crank about the pin 89' causing longitudinal movement of the shaft 83 to the left effecting engagement of the clutch 85. Upon release of the handle the spring 94 will return the parts to their normal position. The operation of the bell crank from the handle 92 is effected by means of interconnected linkage comprising the link 96, to which the bell crank is pivotally connected at 97, adapted to be reciprocated by the crank arm 98 fixed to the oscillatable shaft 99 having an integral pinion portion 100 engaging the rack portion 101 of the reciprocable shaft 102. The handle 95 is fixed to the end of the oscillatable shaft 103 journaled in the knee adapted in turn to reciprocate the shaft 104 through the arm 105 engaging a socket in the collar 106 fixed to the end of the shaft. The shaft is splined in a sleeve 107 journaled in the base of the machine and fixed against longitudinal movement to thereby maintain an operative connection between the ports during vertical adjustment of the knee. The sleeve 107 has a peripheral cam 108 for oscillating the rock shaft 109 which has a projecting portion engaging the groove 110 of shaft 102 for effecting vertical reciprocation thereof. From the foregoing it will be apparent that power actuation of the change feed mechanism may be effected from two control stations on the machine to change the rate of feed of either the saddle, table, knee or spindle carrier.

The rapid traverse movement of these parts is controlled by either the handle 111 (Figure 5) carried by the saddle and operable from the front of the machine or by the handle 112 operable from a position at the side of the machine. These handles are connected to opposite ends of a telescopic shaft 113 mounted in the saddle which has the reduced pinion portion 114 for rotating the shaft 102 through the pinion 115 and interconnected with member 116. The shaft 102 is provided at its upper end with a wide face pinion 117 engaging the rack member 118 for rotating the shaft 119 having an arm 120 engaging a slot in the shifter rod 121 for reciprocation thereof. The rod has a forked member 122 engaging the spool of the clutch member 48. Thus upon rotation of the shaft 113 by either of the control handles 111 or 112, the rod 121 will be reciprocated through the intervening mechanism just described and cause movement of the clutch 48 to the left as shown in Figure 2, connecting the rapid traverse gear 32 with the shaft 47. A spring is provided for constantly urging the clutch into engagement with the feed gear 45, so that upon release of either of the handles the clutch will automatically shift to connect shaft for operation by the gear 45. In other words, the shaft 47 is always connected to the feed transmission except when the clutch 45 is held against the tension of the spring to obtain a rapid traverse rate. It should now be apparent that the actuation of the saddle, table, knee, or spindle carrier at either a feed or rapid traverse rate may be effected or controlled from the operator's normal position at the front of the machine or from a position at the side of the machine.

Figure 3:
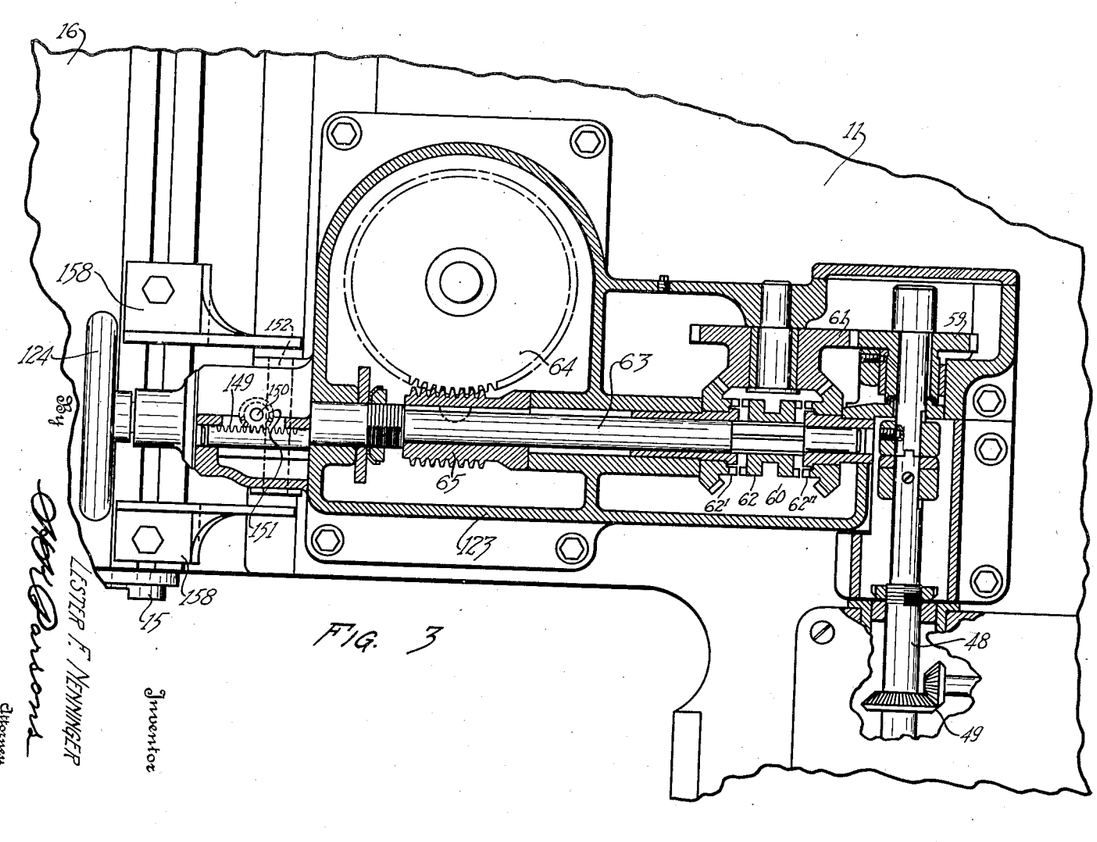
Figure 3 is a sectional view on the line 3—3 of Figure 4.
Figures 4, 10:
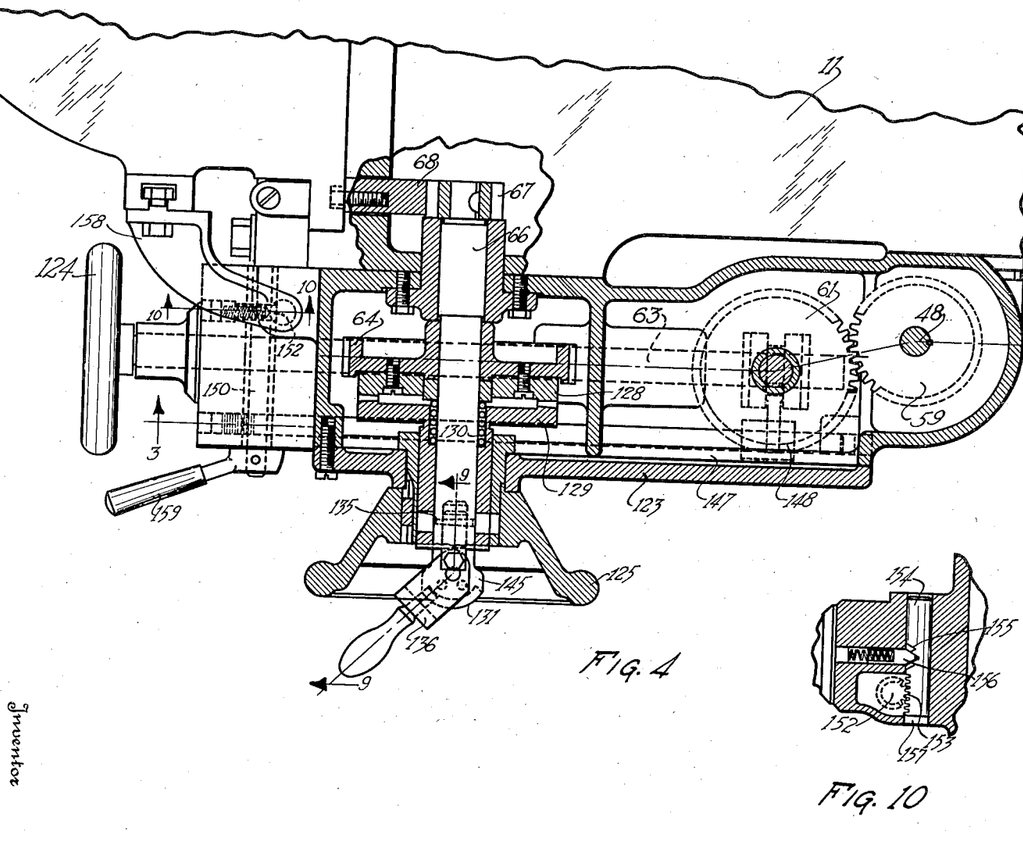
Figure 4 is a sectional view on the line 4—4 of Figure 1.
Figure 10 is a detail of the detent mechanism as viewed on the line 10—10 of Figure 4.

The spindle carrier may also be moved at feed or rapid traverse rates by manual means as well as by the power means heretofore described. The shaft 63, previously referred to, is extended through the housing 123 attached to the upper part of the column to receive a hand wheel 124. When the clutch member 62 is in neutral position it is possible to rotate the shaft by means of the hand wheel to effect reciprocation of the spindle carrier at a feed rate. Provision has also been made for manually reciprocating the spindle carrier at a rapid traverse rate by means of the hand wheel 125. To this end the worm wheel 64 is provided with a clutch face 128, shown more particularly in Figure 4, for engagement with a clutch element 129 slidably mounted on the shaft 66. A spring 130 is interposed between the clutch elements for maintaining them normally in a separated position. A quadrant member 131, having a reduced end 132 inserted in a bore in the end of the shaft 66 and pinned therein as by the tapered pin 135, is provided for supporting the clutch operating member 136 pivoted to the quadrant by the pin 137. A bushing 138 is journaled in the exterior wall of the housing 123 and has keyed to an exterior projection thereof the hand wheel 125. Clutch member 129 has an extended sleeve like portion 139 extending through the bore of the bushing and keyed thereto for rotation therewith. The end of the sleeve 139 is formed with a pair of integral lugs 140 and 141 diametrically opposed to one another for supporting the screws 142 which have the reduced end portion 143 for engaging the raised cam portion 144 of the lever 136. The cam portion engages the shoulder 144' on the end of the sleeve 139 and is so formed that upon rotation of the lever 136 to the right as shown in Figure 4, the cam surface 145' will permit the spring to separate the clutch members and upon rotation to the left will force the clutch member 129 into engagement with the clutch member 128 against the tension of the spring 130. In order to hold the parts in adjusted positions, a spring pressed ball 145 is inserted in a bore in the quadrant 131 for engaging the sockets 146 formed in the member 136 thereby forming a detent mechanism. The reduced end portions 143 of the screws 142 are adapted to be engaged by the cam surface 144 to insure positive separation of the clutch members in the event that the spring is slow to act or fails to act. The operation of the parts is such that when the clutch is in disengaged position the hand wheel 125 may be rotated to effect direct rotation of the shaft 66 and thereby move the vertical head at a rapid traverse rate. Upon engagement of the clutch the shaft 66 is connected to the worm 65 for actuation thereby through the worm wheel 64 and since the worm 65 can be rotated at a power feed rate by engagement of clutch 48 with gear 45 (Figure 2) in opposite directions by selective engagement of clutch 62 with clutch teeth 62' or 62'' (Figure 3); at a power rapid traverse rate by engagement of clutch 48 with gear 32 (Figure 2) in opposite directions by selective operation of clutch 62 (Figure 3); or at manual feed rate by rotation of hand wheel 124, it is seen that means have been provided for traversing the spindle carrier at either feed or rapid traverse rates and by either manual or power means.

Provision has also been made for automatically controlling the clutch 62 so that movement of the vertical head between certain limits may be controlled with accuracy and to this end a shifter rod 147 is slidably mounted in the housing having the forked arm 148 at one end for engaging the spool of the clutch 62 and at the other end a rack portion 149. A short horizontal shaft 150 has a pinion portion 151 at one end engaging the rack 149 and a pinion portion 152 at the other end engaging a rack portion 153 of a dog controlled pin 154, shown more particularly in Figure 10. The pin is provided with plurality of detents 155 for engagement by the detent plunger 156 for holding the pin and thereby the clutch 62 in any one of its three positions. It will be noted in Figure 10 that the pin while in neutral position, as shown in this figure, does not project from either end of the bore 157 in which it is slidably mounted. From this it will be seen that when the pin is engaged by either of the dogs 158 carried by the spindle carrier that the pin will only move the clutch to neutral position and will not move the clutch sufficiently to effect a reverse movement. The shifter rod 147 is also adapted for manual operation by providing the handle 159 on the projecting end of the shaft 150. This arrangement acts as a safety feature insuring against the cutter being moved down into the work after it has returned from a cut thereby preventing marring of the work at some undesirable point.

That which is claimed is:

1. A milling machine comprising a column, a work support unit mounted upon the column for movement in a plurality of directions, a spindle carrier unit reciprocably mounted upon the column, power means for actuating these units in any of their directions of movement including rapid traverse means, and a control lever therefor whereby rapid traverse movement of either unit may be effected by a single lever.

2. A milling machine comprising a column, a saddle, table and knee mounted on the column for movement with respect to each other and to the column, a spindle carrier vertically slidable upon the column toward and from the work support elements, a common drive shaft adapted to be operatively connected with each of said elements for actuation thereof, a prime mover, a feed and rapid traverse transmission extending from the prime mover to the shaft, a clutch for selectively connecting the shaft with either transmission, a plurality of control stations, a single lever at each station whereby the rate of movement of any movable part may be determined from different stations of the machine but by a single control lever at any station.

3. A milling machine comprising a column, a work support unit mounted thereon for movement in a plurality of directions, a spindle carrier unit slidable thereon, actuating means for said units comprising a prime mover, a common drive shaft, a variable feed transmission interposed between the prime mover and the drive shaft, power means for effecting rate changes in said transmission, and a control lever for determining the operation of said means by the prime mover whereby the rate of either unit may be controlled by a single lever.

4. A milling machine comprising a work support unit and a spindle carrier unit, means for effecting relative adjustment between the units comprising a variable feed transmission, a prime mover for actuation thereof, branch transmission extending from the feed transmission to each of said units, a power actuated rate change mechanism operatively connected with said feed transmission and dual control means therefor whereby rate changes may be effected in either unit from different operating positions on the machine.

5. A milling machine comprising a column, a work support unit thereon and a cutter carrier unit slidable thereon and over hanging the work support unit, a variable feed transmission for actuating either of said units, a prime mover for actuating said transmission, a branch transmission from the prime mover operatively connected to a rate change mechanism, a clutch in said branch transmission for selectively connecting the mechanism with the prime mover for effecting rate changes in the variable feed transmission and means to operate said clutch from the operator's normal position at the front of the machine or from a position at the side of the machine.

6. A milling machine having a column, a tool holder translatable thereon in a vertical plane, a work holder, translatable units between the work holder and the column for effecting movement thereof in different planes, a common actuator for said translatable parts, a prime mover, a variable feed transmission and a rapid traverse transmission connecting the prime mover with said actuator, means to selectively determine which of said transmissions will be coupled with the actuator including an axially shiftable rod, a control lever for said means located on one of said translatable units, an additional control lever remote therefrom located on the column, and individual motion transmitting means coupling each lever to said rod.

7. In a milling machine having a column, a tool carrier translatable on the column, a work support, a plurality of translatable units between said work support and column for effecting movement thereof in a plurality of different planes, a common actuator for said translatable parts, a prime mover, a variable feed transmission connecting the prime mover with said actuator, power actuated rate change control mechanism coupled with said transmission for effecting rate changes therein, a control lever located on one of said translatable units for determining the application of power to said mechanism and an additional control lever therefor located on a fixed part of the machine whereby the feed rate of either the tool carrier or the work holder may be controlled from the operator's normal position at the front of the machine or from an operating position at the side of the machine.

8. A milling machine having a column, a work support mounted thereon, a tool carrier translatably mounted thereon for movement toward and from the work support, a prime mover, a transmission connecting said prime mover with the spindle carrier for power translation thereof including a housing attached to the side of the column, a power shaft journaled in the housing, a second shaft operatively connected with the spindle carrier having a worm gear mounted thereon for free rotation, an intermediate shaft connecting the power shaft to the worm gear, means to determine the effective coupling of the power shaft to the intermediate shaft and a clutch for connecting the worm gear to its shaft to effect translation of the spindle carrier.

9. A milling machine having a column, a work support carried thereby, a vertical spindle carrier mounted on the column to over hang the work support, means to translate the carrier toward and from the work support including a prime mover, a variable feed transmission, and a rapid traverse transmission continuously operated by the prime mover, a vertical power shaft, means for selectively coupling the shaft with either transmission, an intermediate shaft having a worm thereon meshing with a worm gear mounted for free rotation on a second shaft operatively connected with said carrier, a reverser interposed between the power shaft and the intermediate shaft for determining the direction of rotation of the worm, and clutch means for connecting the worm gear to its shaft to effect translation of the spindle carrier.

10. A milling machine having a column, a work support carried thereby, a spindle carrier mounted thereon and adapted to be power actuated toward and from the work support, power means for effecting said translation including a power shaft, an intermediate shaft operatively connected with said spindle carrier, clutch means to determine the effective coupling of the power shaft to the intermediate shaft, and automatic control means for said clutch including a dog operated plunger mounted on a fixed part of the machine and control dogs carried by the spindle carrier adapted to effect disconnection of the clutch after a predetermined movement of the carrier.

11. A milling machine having a column, a spindle carrier vertically translatable upon the column, power means mounted in the column for effecting translation thereof including a power shaft, an intermediate shaft operatively connected with said spindle carrier, clutch means for determining the effective coupling of the power shaft to the intermediate shaft, automatic control means for said clutch including a dog operated control plunger extending parallel to the direction of carrier movement, operative connections between said plunger and said clutch, said clutch having a neutral position and a power transmitting position on each side thereof, detent means for holding the control plunger and thereby the clutch in any one of its three positions, and control dogs positioned on the spindle carrier for engaging either end of the plunger to move the clutch from either power transmitting position to a neutral position.

12. A milling machine having a column, a spindle carrier vertically translatable upon the column, power means mounted in the column for effecting said translation including a power actuated shaft, an intermediate shaft operatively connected with said spindle carrier, clutch means for determining the effective coupling of the power shaft to the intermediate shaft, automatic control means for said clutch including a dog operated control plunger extending parallel to the direction of carrier movement, operative connections between said plunger and said clutch, said clutch having a neutral position and a power transmitting position on each side thereof, detent means for holding the control plunger and thereby the clutch in any one of its three positions, control dogs positioned on the spindle carrier for engaging either end of the plunger to move the clutch from a power transmitting position to a neutral position, and manual means for moving the clutch from a neutral position to a power transmitting position.

13. In a milling machine having a column, a spindle carrier translatably mounted thereon, means to effect translation thereof, comprising a rack attached to the carrier, a shaft journaled in the column having operative connections with said rack, a worm gear mounted on said shaft for free rotation, a second shaft journaled in the column at an angle to the first shaft having a worm gear meshing with said worm gear, power means for actuating said second shaft, additional manual means for actuation thereof, a clutch for coupling the worm gear with its shaft for effecting feeding movement in the spindle carrier by either manual or power means and additional manual means for rotating said first named shaft when said clutch is disconnected to effect rapid traverse movement of said spindle carrier.

14. A milling machine having a column, a spindle carrier slidably mounted thereon, actuating means therefor comprising a rack and pinion one of which is attached to the carrier, a shaft journaled in the column for supporting the pinion, a power actuated gear mounted for free rotation in the shaft, means to couple the gear with said shaft including a clutch member splined therein engageable with clutch teeth formed in the gear, resilient means to maintain the parts normally disengaged, a cam member pivoted to the end of the shaft at right angles to the axis thereof, and having cam surfaces abutting the end of the clutch member in opposition to the resilient means, and means to pivot said member to cam the clutch against said opposition into driving engagement with said gear to effect power actuation of the spindle carrier and detent means to maintain the parts in adjusted position.

15. A milling machine comprising a column, a work support unit mounted upon the column for movement in a plurality of directions, a spindle carrier unit reciprocably mounted upon the column, power actuated means for effecting translation of the units along any of their paths of movement including a feed mechanism and a rapid traverse mechanism, a single control lever, and means actuable by the lever for coupling either mechanism to the units whereby the feeding movement of any unit may be changed to rapid traverse by a single lever.

16. A milling machine comprising a column, a work support unit mounted upon the column for movement in a plurality of directions, a spindle carrier unit reciprocably mounted upon the column, power means for actuating these units in any of their directions of movement including rapid traverse means, a control lever therefor whereby rapid traverse movement of either unit may be effected by a single lever, a supplementary control lever, means operatively coupling the supplemental lever to the control lever whereby the rapid traverse movement of either unit may be controlled from a plurality of stations.

17. A milling machine comprising a column, a work support unit mounted upon the column for movement in a plurality of directions, a spindle carrier unit reciprocably mounted upon the column, power actuated means for effecting translation of the units along any of their paths of movement including a feed mechanism and a rapid traverse mechanism, a single control lever for determining the coupling of either mechanism to the units whereby the feeding movement of any unit may be changed to rapid traverse by a single lever, a supplemental control lever and motion transmitting means coupling the supplemental lever to the control lever whereby the rate may be controlled from an additional station at the machine.

18. A milling machine comprising a column, a knee reciprocably mounted upon the column, a saddle mounted on the knee for transverse movement toward and from the column, a table reciprocably mounted on the saddle for movement transverse to the direction of saddle movement, vertical guideways formed on the column above the table, a spindle carrier reciprocably mounted on said guideways, a variable feed transmission mounted in the column, a common drive shaft actuated by the transmission, clutches individual to each movable member for operatively coupling the respective member to said common shaft for actuation by the feed transmission, power actuated means for varying the feed rate of said transmission, and a control lever mounted on the knee for determining operation of said mechanism whereby the feed rate of the spindle carrier may be controlled from the operator's normal position at the work table.

19. A milling machine having a column, a knee vertically slidable on the column, a saddle movable on the knee toward and from the column, a table translatably mounted on the saddle, a spindle carrier over-hanging the work table and movable toward and from the table, a prime mover, a variable feed transmission and a rapid traverse transmission coupled to the prime mover for constant actuation thereby, branch transmissions extending to each movable member, a common drive shaft for actuating the branch transmissions, a clutch for selectively coupling the feed transmission or rapid traverse transmission to the common drive shaft, power actuated means for varying the rate of the feed transmission, a control lever for the clutch mounted on one of said movable members, and a control lever for determining actuation of the feed change mechanism mounted on another of said movable supports.

20. A milling machine having a column, a knee vertically slidable on the column, a saddle movable on the knee toward and from the column, a table translatably mounted on the saddle, a spindle carrier over-hanging the work table and movable toward and from the table, a prime mover, a variable feed transmission and a rapid traverse transmission coupled to the prime mover for constant actuation thereby, branch transmissions extending to each movable member, a common drive shaft for actuating the branch transmissions, a clutch for selectively coupling the feed transmission or rapid traverse transmission to the common drive shaft, power actuated means for varying the rate of the feed transmission, a control lever mounted on the knee for determining operation of the rate change mechanism and a second control lever mounted on the saddle for determining the selective operation of said clutch.

21. A milling machine having a column, vertical guideways formed on one face of the column, a spindle carrier reciprocably mounted upon said guideways, a work table supported by the column beneath the spindle carrier for movement in two directions in a horizontal plane, a power actuated feed transmission mounted in the column, a common drive shaft actuated by the transmission, a clutch for coupling the spindle carrier to the shaft to effect movement thereof toward the table, individual means for selectively coupling the table to said shaft for selective movement respectively in either of its paths, and a single control lever for changing the rate of movement of the carrier or table to a rapid traverse rate.

22. A milling machine having a column, a work support carried thereby, a spindle carrier mounted thereon for movement toward and from the work support, power actuated means for effecting movement of the carrier including a clutch having a neutral position, and a power transmitting position on either side thereof, a reciprocable control plunger, motion transmitting means coupling the plunger to the clutch, control dogs carried by the spindle carrier and positioned at opposite sides of the plunger for engaging opposite ends thereof upon reciprocation of the carrier to move the clutch to a neutral position, detent mechanism for maintaining the parts in said position, and a manual control lever operatively coupled with the plunger for resetting the plunger and initiating movement of the carrier in the opposite direction.

LESTER F. NENNINGER.